United States Patent
Mizuta et al.

(10) Patent No.: US 8,722,241 B2
(45) Date of Patent: May 13, 2014

(54) PACKAGED BATTERY, STACKED BATTERY ASSEMBLY, AND FILM-COVERED BATTERY

(75) Inventors: Masatomo Mizuta, Sagamihara (JP); Kazuaki Utsumi, Sagamihara (JP); Makihiro Otohata, Sagamihara (JP); Hiroshi Yageta, Sagamihara (JP)

(73) Assignee: NEC Corporation, Tokyo (JP)

( * ) Notice: Subject to any disclaimer, the term of this patent is extended or adjusted under 35 U.S.C. 154(b) by 776 days.

(21) Appl. No.: 12/523,667

(22) PCT Filed: Jan. 9, 2008

(86) PCT No.: PCT/JP2008/050096
§ 371 (c)(1),
(2), (4) Date: Jul. 17, 2009

(87) PCT Pub. No.: WO2008/102571
PCT Pub. Date: Aug. 28, 2008

(65) Prior Publication Data
US 2010/0112436 A1  May 6, 2010

(30) Foreign Application Priority Data

Feb. 21, 2007  (JP) ................. 2007-040976

(51) Int. Cl.
*H01M 2/08* (2006.01)
(52) U.S. Cl.
USPC .......................................... 429/185
(58) Field of Classification Search
USPC .......................................... 429/185
See application file for complete search history.

(56) References Cited

U.S. PATENT DOCUMENTS

| 4,678,725 A | 7/1987 | Kikuchi et al. |
| 2004/0175609 A1 | 9/2004 | Yageta et al. |
| 2005/0158622 A1* | 7/2005 | Mizuta et al. ................. 429/185 |

FOREIGN PATENT DOCUMENTS

| CN | 1642728 A | 7/2005 |
| CN | 1864284 A | 11/2006 |
| EP | 1744383 A1 | 1/2007 |
| JP | 11-312505 A | 11/1999 |
| JP | 2003132868 A | 5/2003 |
| JP | 2004-079464 A | 3/2004 |

(Continued)

OTHER PUBLICATIONS

Office Action dated Jan. 8, 2013, issued by the Japanese Patent Office in counterpart Japanese Application No. 2009-500098.

(Continued)

*Primary Examiner* — Ula C Ruddock
*Assistant Examiner* — Jacobs Marks
(74) *Attorney, Agent, or Firm* — Sughrue Mion, PLLC

(57) ABSTRACT

A packaged battery, an assembled battery, and a film-covered battery, which can prevent a dangerous state involving a high-pressure gas filled in the film-covered battery while ensuring a sealing reliability, are provided.

The Packaged battery includes film-covered battery 1 including a battery element and exterior films forming a sealed space housing the battery element, and holding member 10 holding film-covered battery 1. The sealed space includes a housing section housing the battery element, and a pocket communicating with the housing section to expand when the pressure in the sealed space increases. The pocket includes a safety valve which activates when the pocket expands. Holding member 10 includes an opening and a cavity fitting the housing section therein. When the housing section is fitted into the cavity, at least part of the pocket and the safety valve protrude to the outside of the holding member from the opening.

9 Claims, 11 Drawing Sheets

(56) References Cited

FOREIGN PATENT DOCUMENTS

| | | | |
|---|---|---|---|
| JP | 2004-265762 A | | 9/2004 |
| JP | 2004-265762 | * | 10/2004 |
| JP | 2005-203262 A | | 7/2005 |
| JP | 2005-302501 A | | 10/2005 |
| JP | 2006-054099 A | | 2/2006 |
| JP | 2006-079858 A | | 3/2006 |
| JP | 2006-156185 A | | 6/2006 |
| JP | 2007-141640 A | | 6/2007 |
| WO | 2006/016535 A1 | | 2/2006 |
| WO | 2006/126446 A1 | | 11/2006 |

OTHER PUBLICATIONS

Office Action, dated Sep. 4, 2013, issued by the State Intellectual Property Office of the People's Republic of China in counterpart Chinese Application No. 201110312434.1.

* cited by examiner

10a2 Recess
10a Holding Section
Recess 10a3
10a1 Recess
10a4 Cavity

5 Exterior Film

F2
7 Fusion-Bonding Free Area
5d Fusion-Bonded Film Protrusion
8 Throughhole

PACKAGED BATTERY, STACKED BATTERY ASSEMBLY, AND FILM-COVERED BATTERY

TECHNICAL FIELD

The present invention relates to a film-covered battery which contains a battery element in a sealed space formed of exterior films, a packaged battery, and a stacked battery assembly.

BACKGROUND ART

A film-covered battery is known, using a film as an exterior material. Generally, in a film-covered battery, a battery element, which is comprised of a positive plate, a negative plate, electrolyte, and the like, is housed in a sealed space formed of films.

In this regard, the sealed space is formed by thermally fusion-bonding opposing films around the battery element while it is surrounded by the films. Also, lead terminals are connected to the positive plate and negative plate of the battery element, respectively. These lead terminals protrude from the films.

As a film-covered battery is applied with a voltage which is out of a predefined range, gas is generated due to the electrolysis of an electrolyte solvent. The thus generated gas causes an increase in the inner pressure of the sealed space. Also, when the film-covered battery is used at high temperatures out of a predefined range, a material which causes gas is produced due to the decomposition of electrolytic salt and the like.

Basically, it is ideal to use a film-covered battery within a predefined range so as not to generate a gas. However, a large amount of gas can be sometimes generated within a sealed space when a control circuit for controlling a film-covered battery fails because of applying abnormal voltage to the film-covered battery, or when the temperature abnormally rises in surroundings due to some cause.

When a gas is generated in the sealed space, the inner pressure increases within the sealed space. This causes a rupture of a film or peeling of a fusion-bonded part of the films, and a gas is discharged from that part. Since it is impossible to identify where the film will burst and where the film will peel, devices located nearby can be adversely affected depending on where the film bursts or peels.

Patent Document 1 (JP-2005-203262A) describes a film-covered battery which is capable of discharging gas generated within the film-covered battery to the outside from a particular location of the film-covered battery.

This film-covered battery is provided with an inlet-shaped fusion-free zone continuous to a space which surrounds a battery element, which adjoins a fusion-bonding free area of films. As the inner pressure increases due to gas generated from the battery element, gas enters the fusion-free zone, and expands the exterior films of the fusion-bonding free area.

As the fusion-bonding free area expands, stress for tearing off the fusion-bonded part of the film concentrates in the fusion-bonded part adjacent to the fusion-free zone. As such, the film peels off progressively in this part in which the stress concentrates (hereinafter referred to as the "stress concentrating part") ahead of the remaining fusion-bonding free area.

A pressure releasing part such as a hole is provided near the stress concentrating part. As the peeling advances in the stress concentrating part, the peeled area reaches the pressure releasing part. As the peeled area reaches the pressure releasing part, the interior of the film-covered battery communicates with the outside through the pressure releasing feature.

In this way, the gas generated within the film-covered battery is discharged to the outside from the pressure releasing feature. Consequently, the gas can be discharged from a particular point (pressure releasing feature).

Patent Document 1: JP-2005-203262A

DISCLOSURE OF THE INVENTION

Problems to be Solved by the Invention

In the film-covered battery described in Patent Document 1, as the fusion-bonding free area expands, more stress is generated to peel off the fusion-bonding free area.

FIGS. 1A and 1B are explanatory diagrams for describing the relationship between the size of the fusion-bonding free area, when it expands, and stress for peeling off the fusion-bonding free area. In this regard, no hatchings are applied to the cross-sections of exterior film 5 which forms fusion-bonding free area 100c and fusion-bonding free area 100a in FIGS. 1A and 1B.

In FIGS. 1A and 1B, stress F for peeling off fusion-bonding free area 100a appears as a force which acts perpendicularly to fusion-bonded face 100b of fusion-bonding free area 100a. Thus, when equal stress f acts on fusion-bonding free area 100c in FIGS. 1A and 1B, stress F for peeling off fusion-bonding free area 100a becomes greater (for example, $F=f\cos\theta$), as smaller angle $\theta$ is formed by the orientation of stress f and the direction perpendicular to fusion-bonded face 100b (direction of stress F).

As shown in FIGS. 1A and 1B, as fusion-bonding free area 100b expands, a larger portion of fusion-bonding free area 100c is brought to be substantially perpendicular to fusion-bonded face 100b. Then, as this part occupies, larger stress F is generated in order to peel off fusion-bonding free area 100a.

On the other hand, the following description may also be given from another point of view. When an inner pressure that results from gas on the inside is applied to the film, the inner pressure will be canceled out by a reaction of a member for restricting the expansion, if the film is in contact with the member on the opposite side. However, when the member for restricting the expansion is not in contact with that site, the inner pressure is supported by a tensile stress in an in-plane direction of the film (tension). Accordingly, as a smaller area of the film is in contact with the member for restricting the expansion, a force calculated by a product of the inner pressure and area becomes larger, resulting in a larger tension. From this fact, when fusion-bonding free area 100c expands, stress F for peeling off fusion-bonding free area 100a becomes larger because a smaller area of the film is in contact with the member for restricting the expansion.

When the film-covered battery described in Patent Document 1 is contained in a holding member to provide a packaged battery, the volume of the expanding fusion-bonding free area is limited by the height of the inner space of the holding member. In other words, the fusion-bonding free area cannot expand beyond the height of the inner space of the holding member. Also, when film-covered batteries are directly stacked one on another, two adjacent film-covered batteries act to prevent the expansion as well, such as restricting the height of the space to which the fusion-bonding free area can expand.

For this reason, the fusion-bonding free area provided with the pressure releasing feature, i.e., the fusion-bonding free area that is used as a safety valve does not peel off unless the inner pressure of the fusion-bonding free area becomes extremely high. This results in a problem in which the film-covered battery is filled with a high-pressure gas.

When the fusion-bonding strength is reduced for the fusion-bonding free area which functions as a safety valve, by way of example, in order that the fusion-bonding free area which functions as a safety valve peels off when a predetermined pressure is reached due to the generation of a gas even if the film-covered battery is held by a holding member, a sealing reliability is degraded during normal use. When importance is placed on the sealing reliability during normal use, the fusion-bonding strength for the fusion-bonding free area which functions as a safety valve is preferably the same as or closest possible to the fusion-bonding strength of the fusion-bonding free area other than the safety valve. In this event, however, the safety valve will not open unless the pressure becomes high, causing an increase in the risk of fracture in sealing in a local fusion-bonding free area other than the safety valve.

Notably, the problem of a high-pressure gas fills a film-covered battery arises not only when the film-covered battery is held in a holding member, but also when the fusion-bonding free area does not largely expand.

It is an object of the present invention to provide a packaged battery, a stacked battery assembly, and a film-covered battery which are capable of solving the problems described above.

Means for Solving the Problem

A first packaged battery of the present invention includes a film-covered battery including a battery element, and exterior films which form a sealed space for fitting the battery element therein; and a holding member which holds the film-covered battery, the sealed space including a housing section which houses the battery element therein, and a pocket communicating with the housing section to expand due to an increase in the inner pressure of the sealed space, the pocket including a safety valve configured to operate due to expansion of the pocket, wherein the holding member includes an opening and a cavity that fits the housing section therein, and at least part of the pocket and the safety valve protrude to the outside of the holding member from the opening when the housing section is fitted into the cavity.

A second packaged battery of the present invention includes a film-covered battery including a battery element, and exterior films which form a sealed space which fits the battery element therein; and a holding member which holds the film-covered battery, the sealed space including a housing section which houses the battery element therein, and a pocket communicating with the housing section to expand due to an increase in the inner pressure of the sealed space, the pocket including a safety valve configured to operate due to expansion of the pocket, wherein the holding member includes an opening, and the pocket is folded or wound, and is unfolded or unwound due to an increase in the inner pressure such that at least part of the pocket and the safety valve protrude to the outside of the holding member from the opening.

A third packaged battery of the present invention includes a film-covered battery including a battery element, and exterior films which form a sealed space which fits the battery element therein; and a holding member which holds the film-covered battery, the sealed space including a housing section which houses the battery element therein, and a pocket communicating with the housing section to expand due to an increase in the inner pressure of the sealed space, the pocket including a safety valve configured to operate due to expansion of the pocket, wherein the holding member includes a notch formed at a location opposite to at least part of the pocket and the safety valve when the film-covered battery is held by the holding member.

A first stacked battery assembly of the present invention is comprised of a plurality of stacked film-covered batteries, wherein the film-covered battery includes a battery element, and exterior films which form a sealed space which fits the battery element therein, the sealed space includes a housing section which houses the battery element therein, and a pocket communicating with the housing section to expand due to an increase in the inner pressure of the sealed space, the pocket includes a safety valve configured to operate due to expansion of the pocket, the pocket is positioned on a side orthogonal to the stacking direction in the film-covered battery, and the pockets are disposed at positions different from one another in adjacent the film-covered batteries.

A second stacked battery assembly of the present invention is comprised of a plurality of stacked film-covered batteries, wherein the film-covered battery includes a battery element, and exterior films which form a sealed space which fits the battery element therein, the sealed space includes a housing section which houses the battery element therein, and a pocket communicating with the housing section to expand due to an increase in the inner pressure of the sealed space, the pocket includes a safety valve configured to operate due to expansion of the pocket, and the pocket is folded or wound, and is unfolded or unwound due to an increase in the inner pressure such that at least part of the pocket and the safety valve protrude to the outside of the contour of the adjacent batteries.

A film-covered battery of the present invention includes a battery element including a stacked positive plate and negative plate, and external films which form a sealed space which houses the battery element and which is configured to expand due to a gas which is generated from the battery element, wherein the exterior film includes an opening which is fusion-bonded to define a fusion-bonding free area for the exterior film which is opposite a main surface of the positive plate or negative plate.

Effects of the Invention

According to the present invention, it is possible to prevent a dangerous state in which a film-covered battery becomes filled with a high-pressure gas in an abnormal event, while ensuring sealing reliability during normal use.

BRIEF DESCRIPTION OF THE DRAWINGS

[FIG. 6] A perspective view of holding section 10a.

Figure 1:
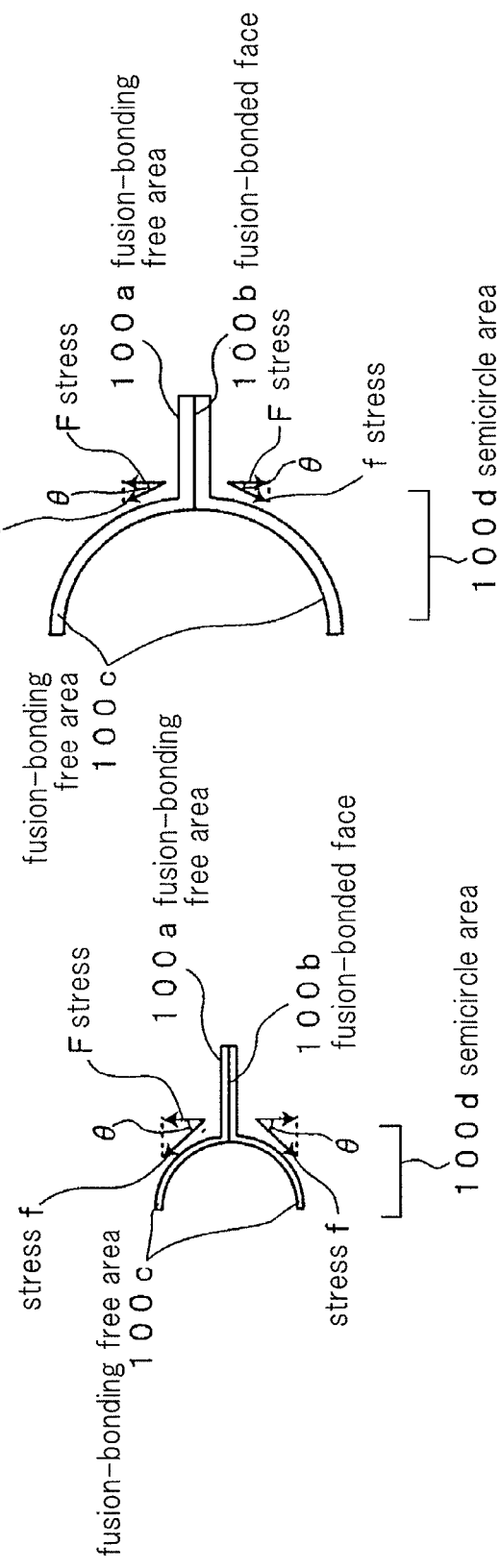
[FIG. 1A] An explanatory diagram for describing the relationship between the size of a fusion-bonding free area when it expands and the stress for peeling off a fusion-bonding free area.
[FIG. 1B] An explanatory diagram for describing the relationship between the size of a fusion-bonding free area when it expands and the stress for peeling off a fusion-bonding free area.

DESCRIPTION OF REFERENCE NUMERALS 1, 1A Film-Covered Batteries
2 Battery Element
2a Positive Plate
2b Negative Plate
2c Main Surface
3 Positive Electrode Lead
4 Negative Electrode Lead
5 Exterior Film
5a Sealing Region
5b Cup Section (housing Section)
5c Fusion-Bonded Film Overhang
5d, 36a, 36b, 36c, 46 Fusion-Bonded Film Protrusions
7, 57 Fusion-Bonding Free Areas
8, 58 Throughholes
8a Safety Valve
9 Packaged Battery
10, 10A Holding Members
10a, 10b, 10Aa, 10Ab Holding Sections
10a1, 10a2, 10a3 Recesses
10a4 Cavity
10c Opening
48 Incision
56 Islandic Fusion-Bonded Area
10A1 Notch
1A1 Fusion-Bonded Area

BEST MODE FOR CARRYING OUT THE INVENTION

Next, exemplary embodiments of the present invention will be described with reference to the drawings.

Figure 2:
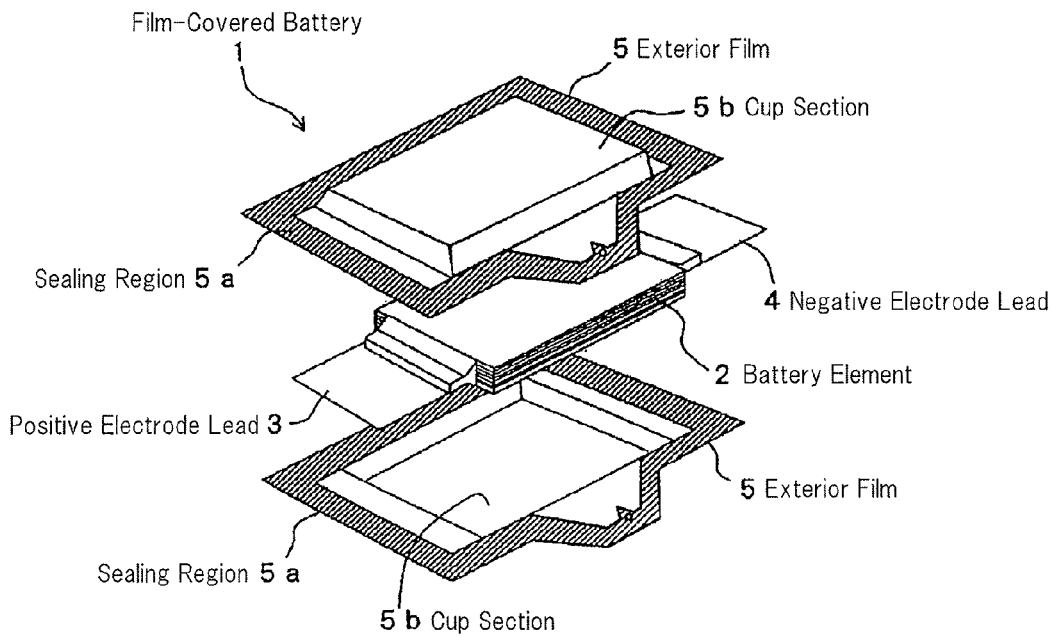
[FIG. 2] An exploded perspective view of a film-covered battery included in a packaged battery according to one embodiment of the present invention.

FIG. 2 is an exploded perspective view of a film-covered battery which is included in a packaged battery according to one exemplary embodiment of the present invention.

Film-covered battery 1 includes flat, substantially rectangular parallelepided battery element 2 comprised of a stack of a plurality of positive plates and negative plates; positive electrode lead 3 and negative electrode lead 4 connected to a positive pole and a negative pole of battery element 2, respectively; and exterior films 5 which seals battery element 2, through which parts of positive electrode lead 3 and negative electrode lead 4 are extended.

Battery element 2 is comprised of a plurality of positive plates and negative plates which are made of metal foil coated with an electrode material on both sides, where the positive plates and negative plates are alternately stacked through separators.

One side of each positive plate and each negative plate is provided with an uncoated portion which is not coated with the electrode material. The uncoated portions of the positive plates and the uncoated portions of the negative plates are ultrasonic welded together in a collective manner, and the uncoated portions of the positive plates are connected together to positive electrode lead 3, while the uncoated portions of the negative plates are connected together to negative electrode lead 4. In this exemplary embodiment, positive electrode lead 3 and negative electrode lead 4 are drawn out from the sides of film-covered battery 1 which oppose each other.

In the case of a non-aqueous electrolytic battery such as a lithium ion battery, aluminum foil is used for the metal foil which comprises the positive pole, while copper foil is used for the metal foil which comprises the negative pole. An aluminum plate is used for positive electrode lead 3, while a nickel plate or a copper plate is used for negative electrode lead 4. When a copper plate is used as negative electrode lead 4, nickel plating may be applied on the surface of the copper plate.

As separators, a laminar member capable of being impregnated with electrolyte is used, such as a micro-porous film made of a thermoplastic resin (micro-porous film) such as polyolefin, unwoven fabric or woven fabric, and the like.

Exterior films 5 comprise two laminate films which sandwich and surround battery element 2 from both sides in the thickness direction of battery element 2. Opposite surfaces of exterior films 5 which overlap around battery element 2 are fusion-bonded to form a sealed space in which battery element 2 is fitted.

In FIG. 2 the fusion-bonded regions of external films 5 are indicated by hatchings as sealing regions 5a.

Cup section 5b is formed in a central region of each external film 5. Cup section 5b forms a housing section which is a space for housing battery element 2. Cut section 5b is processed, for example, by deep draw molding.

In the example shown in FIG. 2, cup sections 5b are formed in both external films 5, but cup section 5b may be formed in only one of external films 5. Alternatively, cup section 5b may not be formed, but the elasticity of external films 5 may be exploited to form a housing section for surrounding and housing battery element 2.

The laminate film used to comprise external films 5 may be a film generally used for this type of film-covered battery as long as it has elasticity and can seal battery element 2 such that the electrolyte will not leak.

A representative layer composition of the laminate film used for external films 5 may be a laminate of a metal thin film layer and a thermally adhesive resin layer, or a laminate of a metal thin film layer, a thermally adhesive resin layer, and a protection layer, laminated on the opposite side of the metal thin film layer to the thermally adhesive resin layer, made of a film of polyester such as polyethylene terephtalate, nylon or the like. When battery element 2 is sealed, the thermally adhesive resin layers are placed in opposition to surround battery element 2.

The metal thin film layer used herein may be, for example, foil of Al, Ti, Ti alloy, Fe, stainless steel, Mg alloy or the like having a thickness of 10 μm-100 μm.

The resin used for the thermally adhesive resin layer is not particularly limited as long as it can be thermally fusion-bonded. For example, polypropylene, polyethylene, acid metamorphosed versions thereof, polyphenylene sulfide, polyester such as polyethylene terephtalate, polyamide, ethylene-vinyl acetate copolymer, and the like are used as the thermally adhesive resin layer. The thickness of the thermally adhesive layer is preferably in the range of 10 μm to 200 μm, and more preferably in the range of 30 μm to 100 μm.

Figure 3:
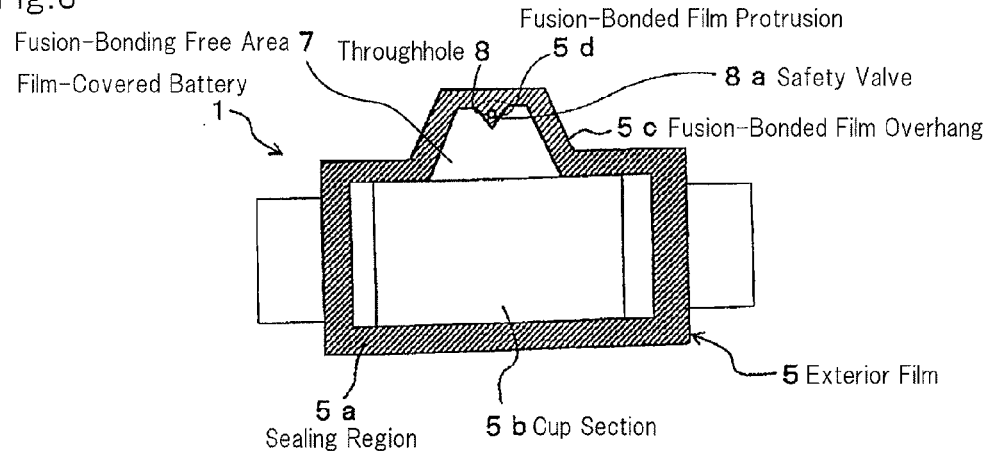
[FIG. 3] A top plan view of the film-covered battery shown in FIG. 2.

Next, characteristic structures in sealing region 5a of film-covered battery 1 will be described with reference to FIG. 3. FIG. 3 is a top plan view of film-covered battery 1 shown in FIG. 2.

As shown in FIG. 3, fusion-bonding free area 7, which includes parts of external films 5 that are not thermally fusion-bonded together, is provided on one side of sealing region 5a in such a manner that fusion-bonding free area 7 communicates with cup section 5b (housing section).

Associated with fusion-bonding free area 7 which is provided in communication with cup section 5b, external film 5 includes fusion-bonded film overhang 5c, outside of the site at which fusion-bonding free area 7 is placed, in order to secure certain sealing region 5a over its entire periphery.

External film 5 is also formed with fusion-bonded film protrusion 5d which protrudes from sealing region 5a outside of fusion-bonding free area 7 toward cup section 5b. Fusion-bonded film protrusion 5d is formed with throughhole 8 which extends through external films 5. In this regard, fusion-bonded film protrusion 5d and throughhole 8 make up safety valve 8a.

A space defined by fusion-bonding free area 7 surrounded by cup section 5b, fusion-bonded film overhang 5c (sealing region 5a), and fusion-bonded film protrusion 5d (hereinafter referred to as the "expansion prearrangement section") communicates with cup section 5b (housing section), and a space through which the expansion prearrangement section communicates with cup section 5b is hermetically sealed by sealing region 5a. Here, a portion made up of the expansion prearrangement section, fusion-bonded film overhang 5c, and safety valve 8a corresponds to a pocket in the present invention.

Figure 4:
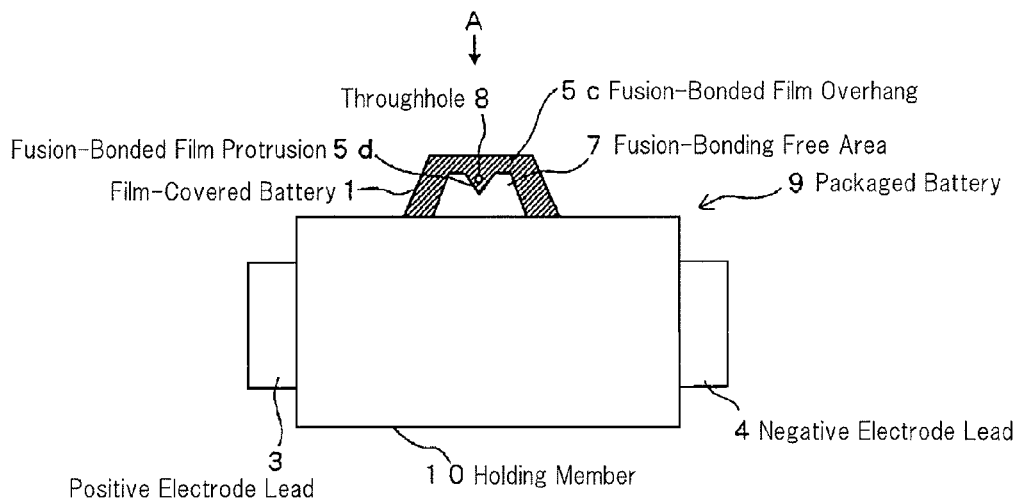
[FIG. 4] A top plan view showing a packaged battery according to one embodiment of the present invention.
Figure 5:
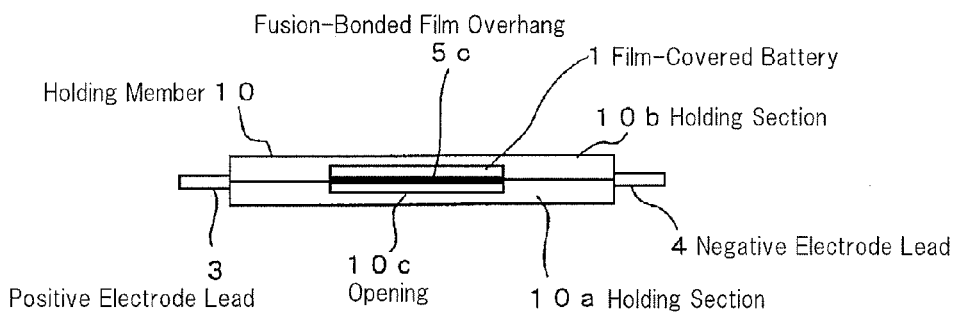
[FIG. 5] A top plan view of the packaged battery shown in FIG. 4.

FIG. 4 is a top plan view showing a packaged battery according to one embodiment of the present invention, and FIG. 5 is a top plan view of the packaged battery shown in FIG. 4 when viewed from the direction of arrow A. In FIGS. 4 and 5, components identical to those shown in FIG. 2 or 3 are designated the same reference numerals.

Packaged battery 9 of this exemplary embodiment includes film-covered battery 1 and holding member 10.

Holding member 10 is made up of holding section 10a and holding section 10b which are secured to each other, accommodates cup section (housing section) 5b of film-covered battery 1 therein, and includes opening 10c which allows fusion-bonding free area 7, fusion-bonded film overhang 5c (sealing region 5a), fusion-bonded film overhang 5d, and through hole 8 to protrude to the outside. In this exemplary embodiment, holding section 10a and holding section 10b are identical in shape.

Figure 6:
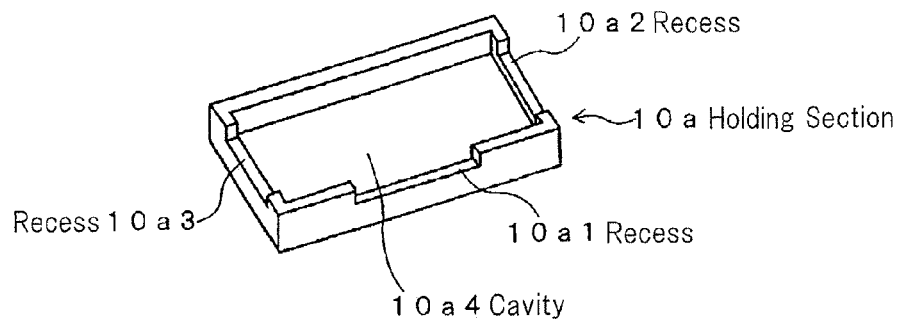

FIG. 6 is a perspective view showing holding section 10a.

In FIG. 6, holding section 10a includes recess 10a1 which forms opening 10c, recess 10a2 and recess 10a3 which form openings through which the leads are passed, and cavity 10a4 for fitting cup section (housing section) 5b therein. As shown in FIGS. 5 and 6, cavity 10a4 includes opening 10c.

Holding section 10a and holding section 10b are secured to each other in such a manner that recesses 10a1 oppose each other through fusion-free section 7, with cup section (housing section) 5b fitted within cavity 10a4.

When film-covered battery 1 is applied with a voltage out of a predefined range, or when film-covered battery 1 is temporarily heated to high temperatures, while film-covered battery 1 is being held by holding member 10, a gas is generated from battery element 2 to cause an increase in the inner pressure within the sealed space defined by cup section 5b and fusion-bonding free area 7.

As the inner pressure increases in the sealed space, the expansion prearrangement area defined by fusion-bonding free area 7 expands. This expansion prearrangement area protrudes outside of holding member 10 through opening 10c. Therefore, the expansion prearrangement area is not restricted by holding member 10 from expanding, but does expand due to the gas generated in the sealed space in which battery element 2 is housed. In other words, the pocket expands.

As the pocket expands more and more, this results in the growth of a stress component of tension generated in the pocket for tearing off fusion-bonded film protrusion 5d (see FIGS. 1A and 1B). As the pocket expands to a predetermined size, fusion-bonded film protrusion 5d gradually peels off by the action of the tension generated in the pocket, and when this peeling reaches the position of throughhole 8, the sealed space which houses battery element 2 communicates with the outside of film-covered battery 1 through throughhole 8, and the pressure which has increased in the sealed space is released through throughhole 8.

It is therefore possible to prevent a dangerous state in which film-covered battery 1 is filled with a high-pressure gas.

Also, since the pocket expands to be larger than the thickness of holding member 10 (a cavity volume defined by holding member 10), a large tear-off stress acts on fusion-bonded film protrusion 5d even if a low inner pressure is present within the sealed space. Thus, it is not necessary to reduce the fusion-bonding strength of fusion-bonded film protrusion 5d. Consequently, degradation in the reliability of the sealing of the sealed space can be prevented.

In the following, a detailed description will be given of how external films 5 peel off progressively in association with an increase in the inner pressure.

Figure 7:
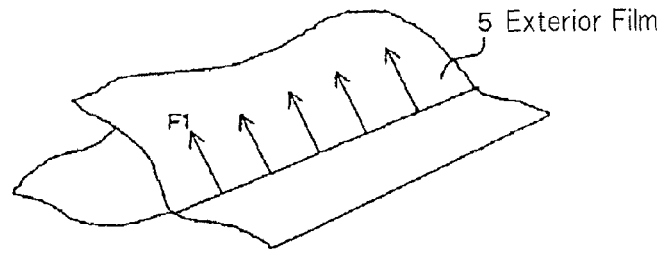
[FIG. 7] An explanatory diagram for describing tear-off stress which acts on exterior film 5.

When a smooth boundary runs between a thermally fusion-bonded region and a fusion-free region of external film 5, tear-off stress F1 acts only in one direction, as shown in FIG. 7, so that the peeling progresses toward the outer edge of external film 5.

Figure 8:
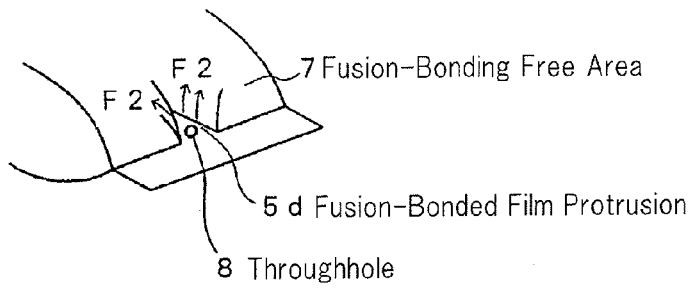
[FIG. 8] An explanatory diagram for describing tear-off stress which acts on a fusion-bonding free area.

However, when fusion-bonded film protrusion 5d is provided, external film 5 expands on both sides of fusion-bonded film protrusion 5d due to a gas filled in fusion-bonding free area 7, so that tear-off stress F2 acts on both sides of fusion-bonded film protrusion 5d, as shown in FIG. 8.

Figure 9:
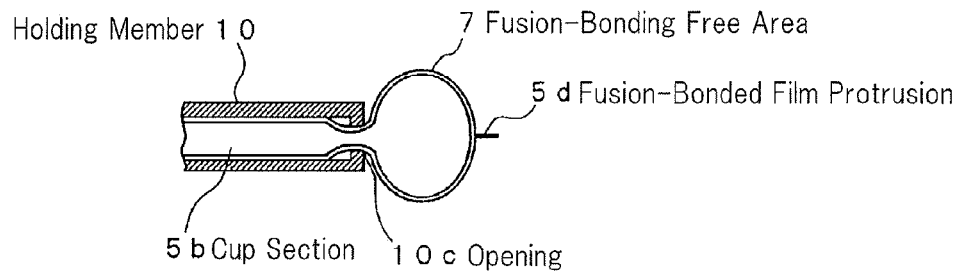
[FIG. 9] An explanatory diagram for describing how the fusion-bonding free area expands.

In greater details, the expansion of cup section 5b is restricted by holding member 10, whereas the expansion of fusion-bonding free area 7 is not restricted by holding member 10. Accordingly, fusion-bonding free area 7 expands more than cup section 5b, as shown in FIG. 9. As can be seen, the cross-section of external film 5 is not hatched in FIG. 9.

As has been described with reference to FIGS. 1A and 1B, the stress for tearing off sealing region 5a become larger as an expandable space adjacent to sealing region 5a has a larger diameter, when a constant inner pressure is present within the sealed space defined by cup section 5b and fusion-bonding free area 7. Therefore, fusion-bonded film protrusion 5d is applied with a larger tear-off stress than that acting on sealing region 5a adjacent to cut section 5b.

Consequently, a larger tear-off stress acts on the corner of fusion-bonded film protrusion 5d than that on remaining sealing region 5a, so that external film 5 at the corner of fusion-bonded film protrusion 5d peals off ahead of other sealing region 5a.

As external film 5 peels off at the corner of fusion-bonded film protrusion 5d, the corner of fusion-bonded film protrusion 5d becomes round, but fusion-bonded film protrusion 5d still maintains a convex shape so that the tear-off stress acts on fusion-bonded film protrusion 5d from a plurality of directions.

Thus, external film 5 peels off progressively ahead of other sealing region 5a until fusion-bonded film protrusion 5d finally substantially disappears, while reducing the sharpness of the convex shape.

Figure 10:
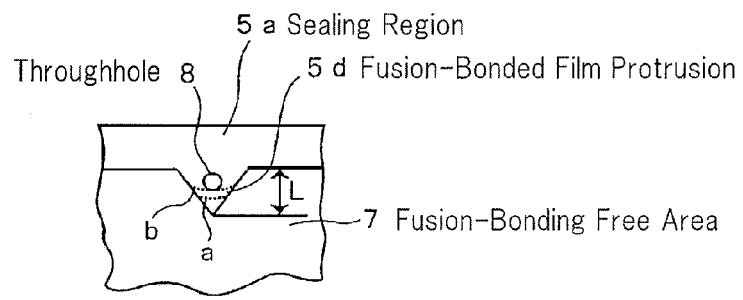
[FIG. 10] An explanatory diagram for describing how exterior film 5 progressively peels off in fusion-bonded film protrusion 5d.

FIG. 10 is an explanatory diagram for describing how external film 5 peels off in fusion-bonded film protrusion 5d.

As shown in FIG. 10, in fusion-bonded film protrusion 5d, peeling progresses from both sides of fusion-bonded film protrusion 5d due to an increase in the inner pressure, like a→b.

External film 5 peels off from a position which depends on the material of external film 5, protruding length L of fusion-bonded film protrusion 5d, and the inner pressure. Accordingly, when the material of external film 5, and protruding length L of fusion-bonded film protrusion 5d have been previously determined, the pressure (releasing pressure) for releasing the sealed space defined by cup section 5d and fusion-bonding free area 7 can be arbitrarily set by adjusting the position of throughhole 8 at the time the interior of the sealed space communicates with the exterior of the sealed space.

Specifically, when throughhole 8 is provided at a position close to the distal end of fusion-bonded film protrusion 5d (closer to cup section 5b), the pressure within the sealed space can be released from throughhole 8 at a low inner pressure, whereas when throughhole 8 is provided near the proximal end of fusion-bonded film protrusion 5d (closer to sealing region 5a), the pressure within the sealed space is not released until the inner pressure becomes high.

In film-covered battery 1, a preferred design release pressure is in the range of 0.05 MPa-1 MPa, and more preferably in the range of 0.1 MPa-0.2 MPa as an increase from the atmospheric pressure.

Even in the case of a minor problem, when a large current temporarily flows or when film covered battery 1 is temporarily headed to high temperatures, if the release pressure is too low, the sealed apace will be released thus rendering film covered battery 1 inoperative.

On the other hand, if the release pressure is too high, another sealing region can be opened before exterior films 5 peel off up to throughhole 8, causing an increase in the danger of gas being discharged in an unintended direction.

As described above, according to this exemplary embodiment, the packaged battery includes an expansion restriction prevention section (for example, opening 10c) for preventing the holding member from restricting or interfering with an expansion of the pocket in at least part of the pocket, when the pocket expands.

Specifically, the pocket provided with safety valve 8a protrudes to the outside of holding member 10 through opening 10c. Thus, the pocket can expand with gas generated in the sealed space without the expansion being restricted by holding member 10.

As the pocket expands more, the stress component of tension generated in the pocket increases to act on safety valve 8a (see FIG. 19).

When the pocket expands to a predetermined size, safety valve 8a is opened by the action of the tension generated in the pocket to release the gas within the sealed space from safety valve 8a.

As such, even without reducing the fusion-bonding strength of the fusion-bonded film protrusion which forms part of safety valve 8a, i.e., even without degrading the sealing reliability, it is possible to prevent a dangerous state, as before, in which the size of the pocket is restricted by holding member 10 to prevent the pocket from expanding to a predetermined size, thus failing to open safety valve 8a, with the result that film-covered battery 1 is filled with a high-pressure gas.

Also, in this exemplary embodiment, as shown in FIG. 3, exterior film 5 is shaped to have fusion-bonded film protrusion 5c. As a result, since sealing region 5a of exterior film 5 whose function is required to seal battery element 2 can be sufficiently reserved in a region in which fusion-bonding free area 7 is formed, the sealing reliability is more improved.

In this regard, while fusion-bonded film protrusion 5d is in a triangular shape in FIG. 3, the shape of fusion-bonded film protrusion 5d can be modified as appropriate provided that it substantially protrudes toward the cavity which houses battery element 2. Several examples of fusion-bonded film protrusion 5d are shown in FIGS. 11A-11C.

Figure 11A:
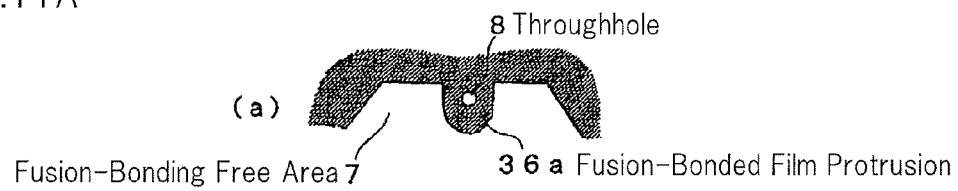
[FIG. 11A] An explanatory diagram showing another exemplary fusion-bonded film protrusion.
Figure 11B:
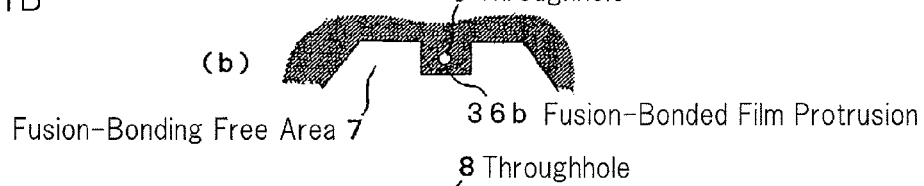
[FIG. 11B] An explanatory diagram showing another exemplary fusion-bonded film protrusion.

Fusion-bonded film protrusion 36a shown in FIG. 11A includes an arcuate leading end. An example shown in FIG. 11B is rectangular fusion-bonded film protrusion 36b. An example shown in FIG. 11C is fusion-bonded film protrusion 36c in a home base shape.

In any of fusion-bonded film protrusions 36a, 36b, and 36c, external films 5 expand not only on the leading end side but also in the fusion-bonding free area on both sides of the fusion-bonded film protrusion, so that a tear-off stress acts not only from the leading end side but also from lateral sides as a result. Consequently, the tear-off stress concentrates in the leading end of fusion-bonded film protrusions 36*a*, 36*b*, and 36*c*, so that peeling advances to the remaining fusion-bonding free area.

Figure 11C:
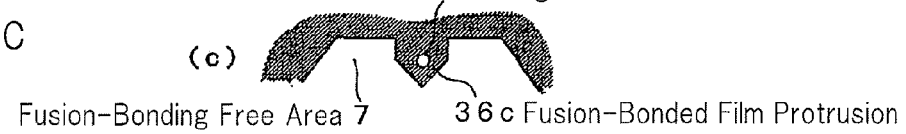
[FIG. 11C] An explanatory diagram showing another exemplary fusion-bonded film protrusion.

In particular, fusion-bonded film protrusion 36*c* shown in FIG. 11C is tapered toward the cavity which houses battery element 2, like fusion-bonded film protrusion 5*d* shown in FIG. 3, and has a sharp leading end. This is a shape which facilitates the progress of peeling from the leading end.

In film-covered battery 1 shown in FIG. 3, a throughhole is used as a pressure releasing feature of the safety valve, but the pressure releasing feature is not limited to the throughhole, and can be modified as appropriate.

Figure 12:
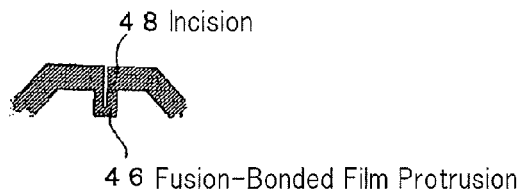
[FIG. 12] An explanatory diagram showing another exemplary pressure releasing feature in a safety valve.

For example, as shown in FIG. 12, notch 48 formed in fusion-bonded film protrusion 46 may be used as a pressure releasing feature. In this event, notch 48 functions in a manner similar to the aforementioned throughhole. In addition, the release pressure can be arbitrarily set by changing the position of the leading end of notch 48.

Structurally, the pressure releasing feature need not be a hole which extends through two exterior films which are laid one above another, as long as it can allow the cavity which houses the battery element to communicate with the outside of film-covered battery 1 when the fusion-bonding free area peels off. The pressure releasing feature may be a throughhole or a notch which is formed through only one of the two exterior films which are laid one above another.

Also, a stress concentrating part in which the tear-off stress concentrates need not be provided as the fusion-bonded film protrusion, but a variety of structures can be applied to the stress concentrating part as long as the tear-off stress acts on the structure in concentration within the fusion-bonded area, which allows the peeling to advance to the remaining fusion-bonding free area as a result.

Figure 13:
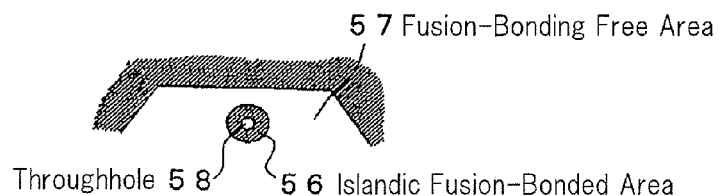
[FIG. 13] An explanatory diagram showing another exemplary stress concentrating part.

FIG. 13 is an explanatory diagram showing another exemplary stress concentrating part.

In FIG. 13, islandic fusion-bonded area 56 is formed as the stress concentrating part independently of the remaining fusion-bonded area within inlet-shaped fusion-bonding free area 57 continuous with a housing section which houses battery element 2. Throughhole 58, which serves as a pressure releasing feature, is formed within islandic fusion-bonded area 56.

In the example shown in FIG. 13, as gas is generated within the housing section which houses battery element 2, the generated gas enters fusion-bonding free area 57, causing exterior films 5 to expand over the entire periphery of islandic fusion-bonded area 56. In this way, tear-off stress acts on islandic fusion-bonded area 56 in concentration, so that the peeling advances to the remaining fusion-bonded area. As exterior films 5 peels off up to throughhole 58 in islandic fusion-bonded area 56, the pressure is released. The release pressure can be arbitrarily set by adjusting the distance from the outer edge of islandic fusion-bonded area 56 to throughhole 58.

In the example shown in FIG. 13, the pressure releasing feature is implemented by a throughhole, but the pressure releasing feature can be a notch instead of the throughhole, as has been described in connection with FIG. 12, or further alternatively, a throughhole or a notch may be formed through or in one of the external films which are laid one on the other.

Also, in common to the respective examples described above, the peeling can be promoted in the stress concentrating part by forcing tear-off stress to effectively act on the stress concentrating part, with the result that the pressure can be released with more certainty. To force the tear-off stress to effectively act on the stress concentrating part, the fusion-bonding free area is preferably configured to facilitate the introduction of a gas which is generated in the housing section which houses battery element 2.

For example, as shown in FIG. 3, fusion-bonding free area 7 may be tapered along at least one side. In this way, fusion-bonding free area 7 can be extended in width, thus facilitating the entry of gas, which is generated in the housing section which houses battery element 2, into fusion-bonding free area 7.

Alternatively, fusion-bonding free area 7 may be positioned in a central zone of a longer side of the housing section which houses battery element 2. This position is such that external films 5 most readily expand in a region in which fusion-bonding free area 7 can be formed, so that by providing fusion-bonding free area 7 at this position, the entry of gas, which is generated in the housing section which houses battery element 2, into fusion-bonding free area 7 is facilitated.

Next, a description will be given of a stacked battery assembly according to one exemplary embodiment of the present invention.

Figure 14:
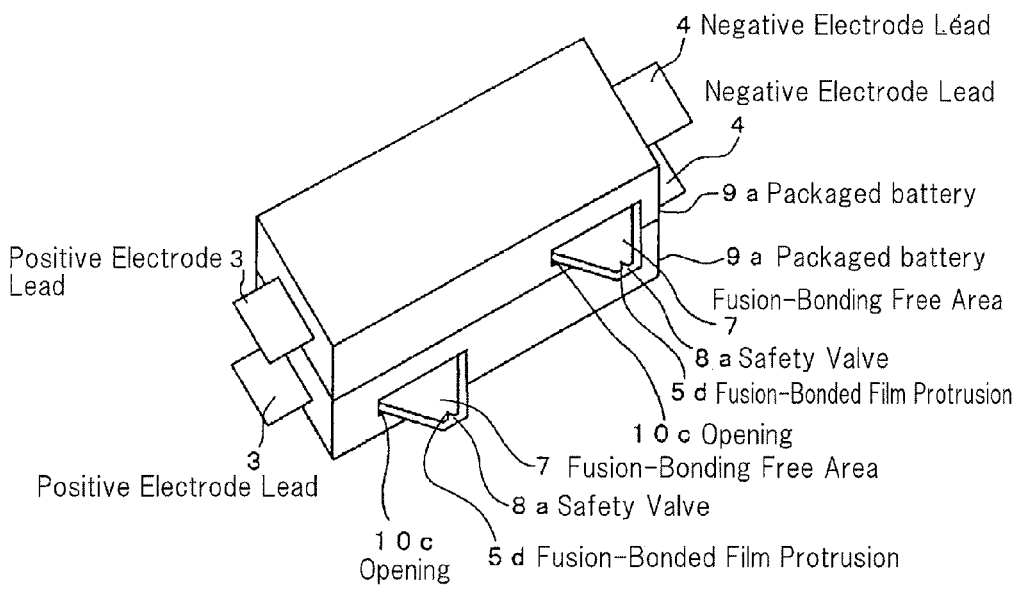
[FIG. 14] A perspective view showing a stacked battery assembly according to one embodiment of the present invention.

FIG. 14 is a perspective view of an exemplary stacked battery assembly which is formed by stacking a plurality of packaged batteries 9*a*-9*a* in a thickness direction of packaged batteries 9*a*, where a expansion prearrangement area (fusion-bonding free area 7) and safety valve 8*a*, as shown in FIG. 4, protrude from opening 10*c* of holding member 10. In FIG. 14, the same components as those shown in FIG. 4 or 5 are designated the same reference numerals. Also, throughhole 8 is omitted in FIG. 14.

In this stacked battery assembly, adjacent packaged batteries 9*a*-9*a* include pockets positioned on a side orthogonal to a direction in which packaged batteries 9*a*-9*a* are stacked such that the pocket protruding to the outside of holding member 10 from opening 10*c* does not come into contact with the pocket of adjacent packaged battery 9*a*, wherein the position of packaged battery 9*a* at which the pocket is provided, the position of opening 10*c* provided in holding member 10, and the position of fusion-bonding free area 7 provided in film-covered battery 1 are different from one another.

According to this exemplary embodiment, since the pockets and openings 10*c* are different in position from one another in adjacent packaged batteries 9*a*-9*a*, the pockets protruding to the outside of holding members 10 from openings 10*c* can be mutually maintained out of contact with the pockets of adjacent packaged batteries 9*a*.

Thus, each pocket can be prevented from restricting the expansion of other pockets. Accordingly, even if a plurality of packaged batteries 9*a* are stacked in their thickness direction, it is possible to prevent a dangerous state in which film-covered batteries 1 are filled with a high-pressure gas.

Figure 15:
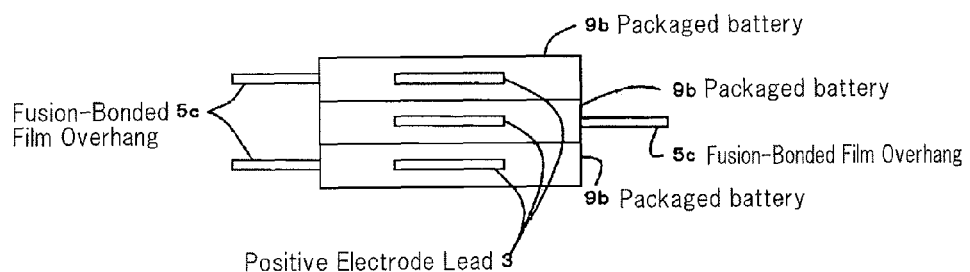
[FIG. 15] A perspective view showing a stacked battery assembly according to another embodiment of the present invention.

FIG. 15 is a top plan view showing a stacked battery assembly according to another exemplary embodiment of the present invention. In FIG. 15, the same components as those shown in FIG. 4, 5 or 14 are designated the same reference numerals.

In FIG. 15, adjacent packaged batteries 9*b*-9*b* have pockets positioned on a side orthogonal to a direction in which packaged batteries 9*b*-9*b* are stacked such that the pockets of adjacent packaged batteries 9*b*-9*b* protrude from opening 10*c* in directions opposite to one another, wherein the position of packaged battery 9*b* at which the pocket is provided, the position of opening 10*c* provided in holding member 10, and the position of fusion-bonding free area 7 provided in film-covered battery 1 are different from one another.

According to this exemplary embodiment, since the pockets protruding to the outside of holding member 10 from opening 10*c* mutually remain out of contact with pockets of adjacent packaged batteries 9*b*, each pocket does not restrict the expansion of other pockets.

Figure 16:
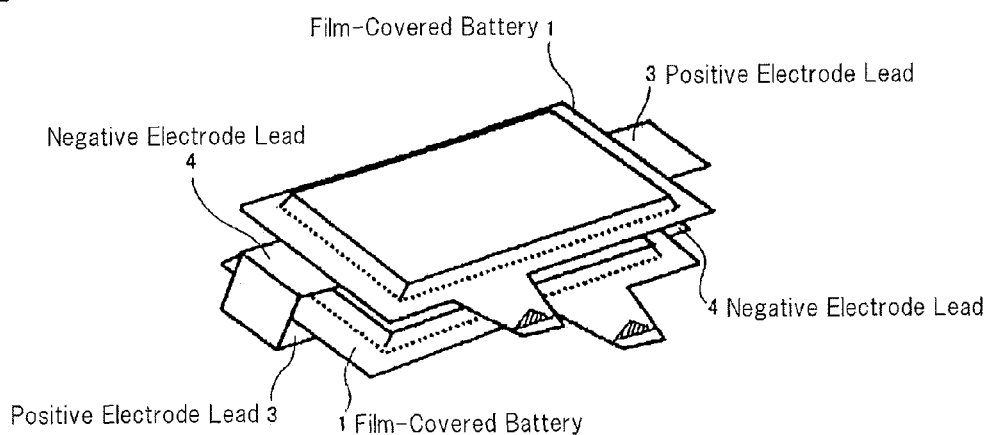
[FIG. 16] A perspective view showing a stacked battery assembly according to a further embodiment of the present invention.

FIG. 16 is a perspective view showing a stacked battery assembly according to a further exemplary embodiment of the present invention. In FIG. 16, the same components as those shown in FIG. 3 are designated the same reference numerals.

In the stacked battery assembly shown in FIG. 16, film-covered batteries are each provided with a pocket which is biased toward one pole (negative pole in FIG. 16), and are alternately stacked upside down.

In this event, the stacked battery assembly is formed of a plurality of film-covered batteries formed on the basis of the same design, but the pockets are disposed at positions at which they do not overlap. Accordingly, it is possible to form a stacked battery assembly which has pockets disposed at positions at which they do not overlap, with film-covered batteries in one type of shape for use in the stacked battery assembly.

Notably, in the packaged batteries (film-covered batteries) shown in FIGS. 4, 5, 14, 15, and 16, as the pocket is increased in size, a wasteful space appears for the pocket to protrude.

For this reason, preferably, in the packaged batteries (film-covered batteries) shown in FIGS. 4, 5, 14, 15, and 16, the pocket is folded or wound in a normal state (when no gas is generated), and simultaneously with the introduction of gas into the pocket, the pocket is unfolded or unwound and expands to a predetermined size.

For example, in the packaged battery shown in FIGS. 4, 5, 14, and 15, preferably, the pocket is folded or wound in a normal state (when no gas is generated), and simultaneously with the introduction of gas into the pocket, the pocket is unfolded or unwound to protrude to the outside of the holding member from the opening, and expands to a predetermined size.

In this regard, the pocket, when folded or wound, may be fixed to the exterior films with an adhesive tape, a bonding agent or the like.

Even when the pockets are arranged at the same position and laid one above another when the batteries are stacked, advantages conforming to the object of the present invention can be produced by keeping the pockets folded or wound. A description will be given below with reference to FIGS. 17A-17C.

Figure 17A:
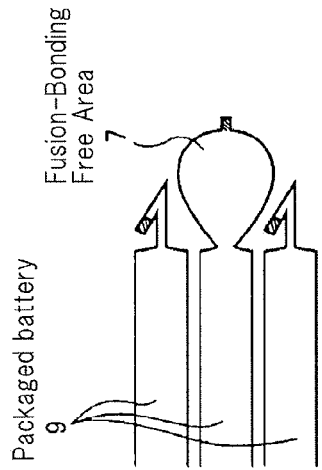
[FIG. 17A] An explanatory diagram showing another exemplary pocket (expansion prearrangement section).
Figure 17B:
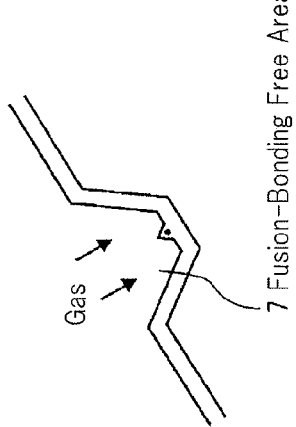
[FIG. 17B] An explanatory diagram showing another exemplary pocket (expansion prearrangement section).
Figure 17C:
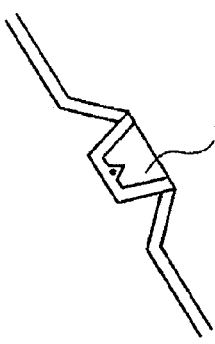
[FIG. 17C] An explanatory diagram showing another exemplary pocket (expansion prearrangement section).

FIGS. 17A-17C are explanatory diagrams which show an exemplary pocket which is normally folded and unfolded simultaneously with the introduction of gas and which expands to a predetermined size. In FIGS. 17A-17C, the same components as those shown in FIG. 4 are designated the same reference numerals.

As shown in FIG. 17A, the pocket (fusion-bonding free area 7) is folded in a normal state (when no gas is generated).

Then, if a gas is generated later in film-covered battery 1, the gas enters the pocket, as shown in FIG. 17B, causing the pocket to be unfolded and to expand to a predetermined size.

As shown in FIG. 17C, when a plurality of packaged batteries 9 are stacked, the pockets are likely to be laid one above another. However, with the pockets normally folded or wound, only in a film-covered battery which fails and suffers increased inner pressure, the pocket is released due to the increased inner pressure, and protrudes to the outside further away than the pockets of other adjacent packaged batteries, so that the pocket is less prevented from expanding by the adjacent batteries, and can expand. In this way, even if a pocket is laid above and below pockets of adjacent batteries, the pocket can expand, and can transmit a large tension to the safety valve with a small inner pressure.

In this regard, the way of folding the pocket is not limited to the example shown in FIG. 17, and can be modified as appropriate.

Figure 18A:
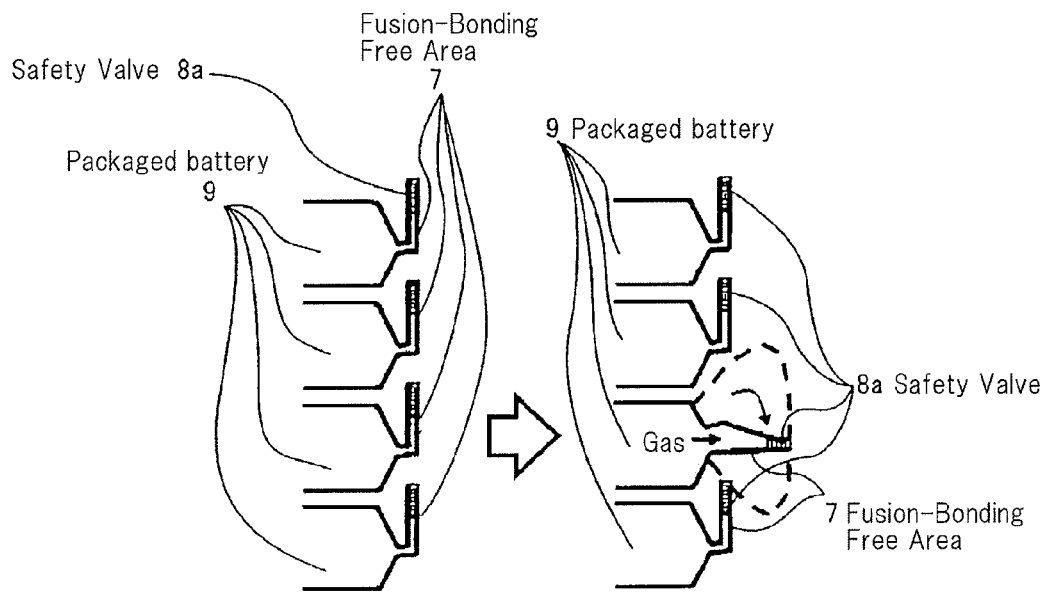
[FIG. 18A] An explanatory diagram showing a further exemplary pocket (expansion prearrangement section).
Figure 18B:
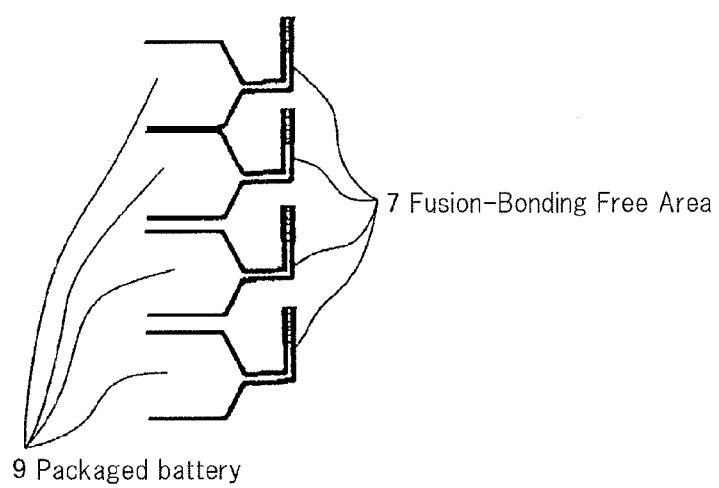
[FIG. 18B] An explanatory diagram showing a further exemplary pocket (expansion prearrangement section).

FIGS. 18A-18B are explanatory diagrams showing other ways of folding the pockets. In FIGS. 18A-18B, a dotted line schematically shows an exemplary shape of the pocket when it expands. In FIGS. 18A-18B, the same components as those in FIG. 8 are designated the same reference numerals.

As shown in FIG. 18A, the sealed side on which the pocket is formed may be bent from its proximal end. Specifically, a normal sealed area beside the pocket is bent together. Likewise, in this event, a gas is injected into the pocket in a battery which fails, causing the bent sealed side to stretch out and the safety valve to burst out of the contour of the adjacent batteries, so that the pocket can expand without interference from the adjacent batteries, and a large force can be effectively applied to the safety valve to readily open the same.

In FIG. 18A, the fold is close to the battery element housing section (cup section), but the fold of the pocket is not so limited, and the pocket may be bent at a position spaced away from the battery element housing section (cup section) to some degree, and the angle at which the pocket is bent may be a right angle or 180 degrees, as shown in FIG. 18B, or may be changed as appropriate.

In the example of FIG. 18B, the pocket is bent near the center. In this event, when an increased inner pressure unbends the pocket to cause the same to protrude outward, a portion which protrudes outward beyond the contour of adjacent batteries is approximately one-half region of the packet. In this way, a majority of the volume of the pocket need not protrude to the outside of the contour of the adjacent batteries, and if the entirety of the released pocket can expand larger than the pocket included inside of the contour of the adjacent batteries, only part of the released pocket may protrude to the outside of the contour of the adjacent batteries.

In FIG. 17C and FIGS. 18A-18B, the implementation of the folded or wound pocket has been described in connection with a stacked battery assembly. However, it goes without saying that the space can be saved when a single battery (single packaged battery) or a film-covered battery without a holding member is provided with a pocket which is normally folded or wound and which is released from the folded state or wound state simultaneously with the introduction of a gas to expand to a predetermined size.

Also, when a stacked battery assembly is formed by stacking film-covered batteries, adjacent film-covered batteries are held by one another.

Therefore, the packaged batteries shown in FIGS. 14, 15, 17C and FIGS. 18A-18B may be film-covered batteries themselves. In this event, since the film-covered batteries also serve as holding members, the configuration can be simplified.

Additionally, in this event, a double-sided tape, a bonding agent, a buffering material, a spacer or the like may intervene between adjacent film-covered batteries.

Figure 19A:
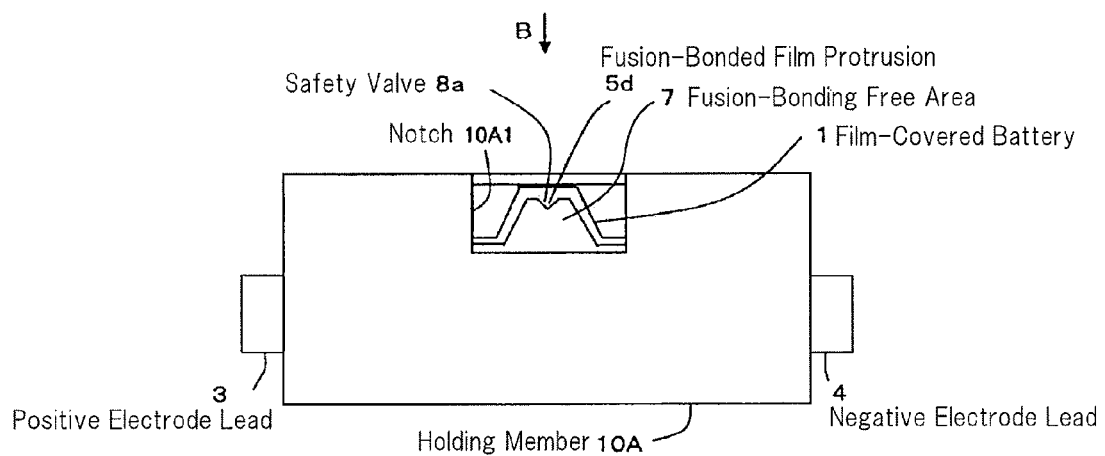
[FIG. 19A] A top plan view showing a packaged battery according to another embodiment of the present invention.
Figure 19B:
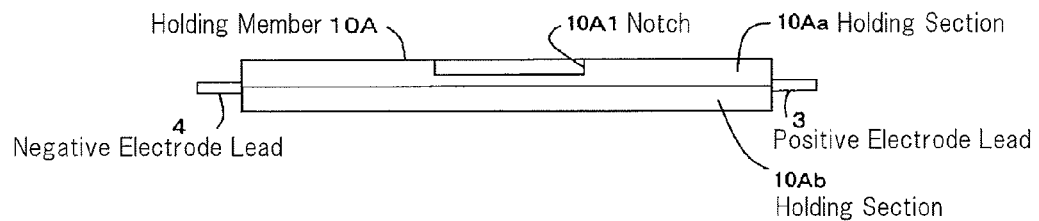
[FIG. 19B] A top plan view showing a packaged battery according to another embodiment of the present invention.
Figure 19C:
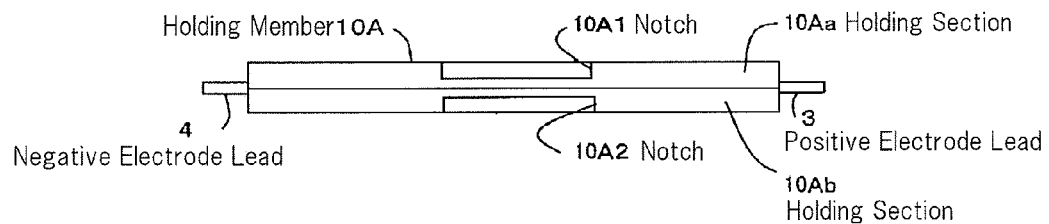
[FIG. 19C] A top plan view showing a packaged battery according to another embodiment of the present invention.

FIGS. 19A-19C are diagrams showing packaged batteries according to another exemplary embodiment of the present invention. Specifically, FIG. 19A is a top plan view of a packaged battery according to the other exemplary embodiment of the present invention; FIG. 19B is a top plan view when FIG. 19A is viewed from the direction of arrow B; and FIG. 19C is a diagram showing an exemplary modification to the packaged battery shown in FIGS. 19A and 19B. In FIGS. 19A-19C, the same components to those shown in FIGS. 2 and 3 are designated the same reference numerals.

In FIGS. 19A-19C, holding member 10A is made up of holding section 10A*a* and holding section 10A*b* which are secured to each other, and contains film-covered battery 1. Holding member 10A is provided with cutout 10A1 at a location which opposes a pocket (fusion-bonding free area 7) and safety valve 8a (fusion-bonded film protrusion 5d and throughhole 8) when film-covered battery 1 is held within holding member 10A. In FIGS. 19A-19C, throughhole 8 is omitted.

In this event, the pocket can expand by the action of a gas which is generated in a cavity for housing battery element 2, due to cutout 10A1, without being restricted by holding member 10A. As the pocket gradually expands, the stress component of tension generated in the pocket, which acts on fusion-bonded film protrusion 5d, increases. As the pocket expands to a predetermined size, fusion-bonded film protrusion 5d is peeled off up to throughhole 8 by the action of the tension generated in the pocket, to discharge the gas within the pocket from throughhole 8.

As such, even without reducing the fusion-bonding strength of fusion-bonded film protrusion 5d, i.e., even without degrading the sealing reliability, it is possible to prevent a dangerous state, as before, in which the size of the pocket is restricted by the holding member to prevent the pocket from expanding to a predetermined size, thus failing to open the safety valve, with the result that film-covered battery 1 is filled with high-pressure gas.

Also, as shown in FIG. 19C, when cutout 10A2 similar to cutout 10A1 is provided at a position opposite to cutout 10A1, i.e., when cutouts are provided on both sides of the pocket, the pocket can further expand, which is more preferable.

While the foregoing description has been given mainly in connection with an illustrative configuration in which a majority of the volume of the pocket protrudes to the outside, the entire volume of the pocket need not protrude to the outside of the holding member or to the outside of the contour of adjacent batteries, but only part of the pocket may protrude to the outside, provided that the pocket can expand larger than a pocket which is entirely placed within the holding member or within the contour of adjacent batteries.

In the description so far given, an overhang of a film of an exterior film material is used for the pocket, but the pocket may not be continuous with the exterior film material and may be made of another bag made of a film, connected to the internal battery space, directly or through a pipe or the like.

Also, the safety valve may be of a type including an incision cut into a film or metal foil, which facilitates the fracture, other than the type as so far described.

Also, the safety valve may not be a type configured to break the sealing by the action of tension caused by an increase in the inner pressure within the pocket. Another type of safety valve may comprise a needle or the like, for example, near the pocket, such that when the pocket expands largely, the surface of the pocket reaches the needle which pierces the pocket thereby allowing gas to be discharged. This is also one type of safety valve which actuates with the aid of the tension in the pocket.

Likewise, in this type of safety valve, since the pocket can expand to a larger volume, the needle can be positioned further away from the pocket, thus making it possible to reduce the risk of the needle coming into contact with an exterior material as a result of unexpected situations such as vibration during use.

Also, by placing the needle at a site to which a folded or wound pocket extends when it is unfolded or unwound, the needle can be placed at a position sufficiently far from the battery, thus making it possible to reduce the risk of needle making contact with an exterior material due to unintended situations.

Figure 20A:
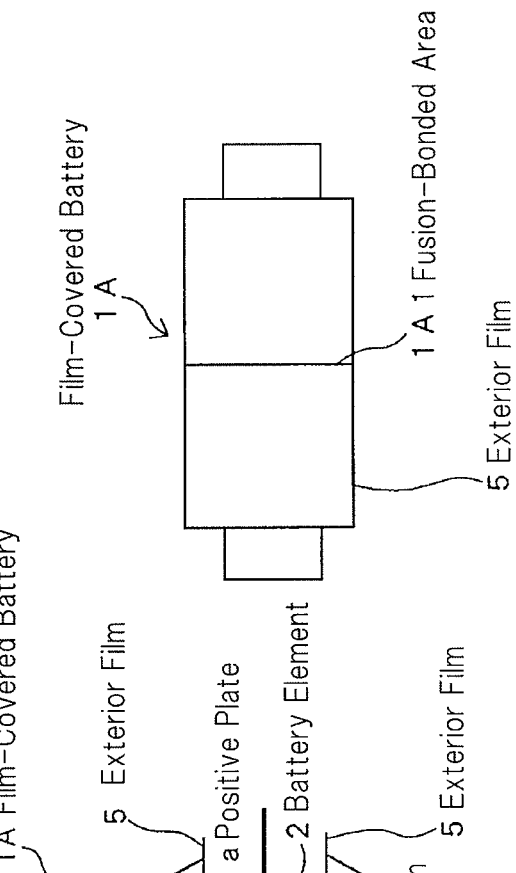
[FIG. 20A] An explanatory diagram showing a film-covered battery according to one embodiment of the present invention.
Figure 20B:
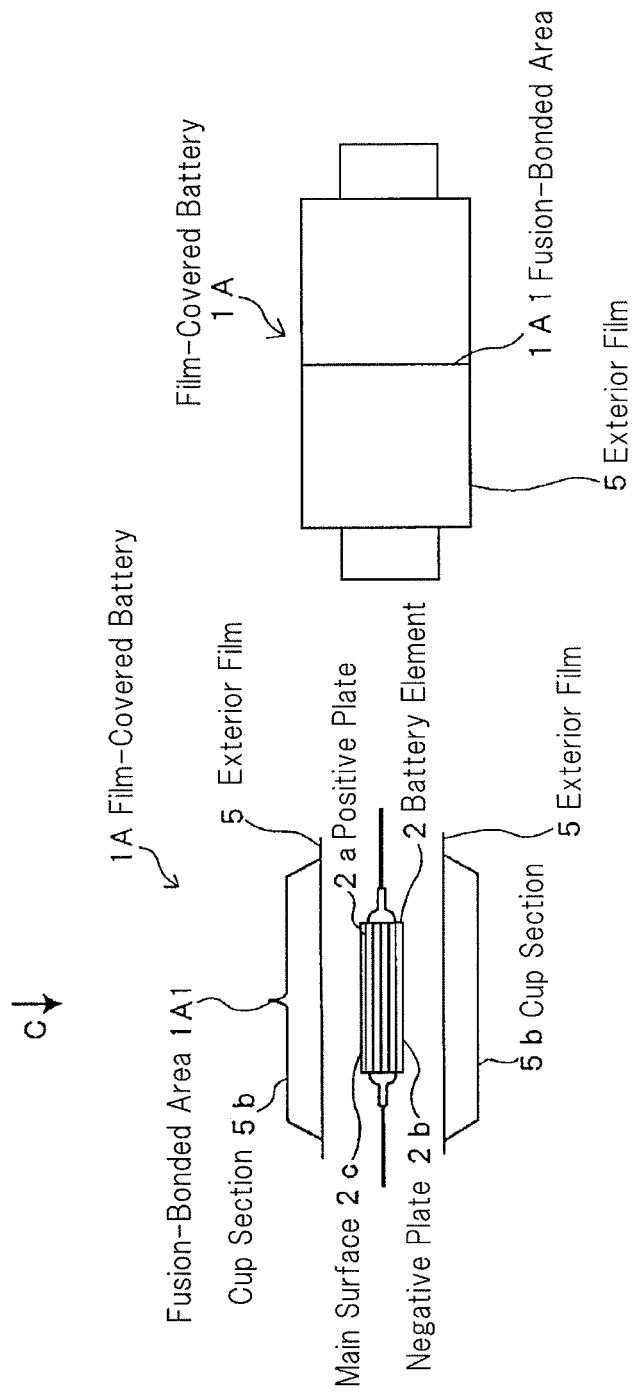
[FIG. 20B] An explanatory diagram showing a film-covered battery according to one embodiment of the present invention.

FIG. 20A is an exploded plan view showing film-covered battery 1A according to another exemplary embodiment of the present invention, and FIG. 20B is a top plan view when FIG. 20A is viewed from the direction of arrow B. In FIGS. 20A-20B, the same components as those shown in FIG. 2 or 3 are designated the same reference numerals.

Film-covered battery 1A shown in FIG. 20A-20B includes battery element 2 having a laminate structure comprised of stacked positive plates 2a and negative plates 2b, and exterior films 5 for fitting battery element 2 therein, formed with cup section 5b which serves as a sealed space which expands due to gas generated from battery element 2, in a manner similar to film-covered battery 1 shown in FIG. 2. Also, exterior film 5 opposite to main surface 2c of positive plate 2a or negative plate 2b is provided with fusion-bonded area 1A1 which is created by thermally fusion-bonding an opening formed between exterior film 5.

In this event, as the sealed space expands due to a generated gas, fusion-bonded area 1A1 is applied with stress which tears off fusion-bonded area 1A1, fusion-bonded area 1A1 is torn off, and the gas discharged from a site at which fusion-bonded area 1A1 is torn off. The stress which tears off fusion-bonded area 1A1 increases because it conforms to the size of main surface 2c of positive plate 2a or negative plate 2b (see FIGS. 1A-1B). Therefore, even if the inner pressure does not increase in the sealed space in which the battery element is fitted, fusion-bonded area 1A1 is torn off, causing the gas to be discharged from the site at which fusion-bonded area 1A1 is torn off.

Consequently, the gas within the sealed space can be discharged to the outside even without reducing the fusion-bonding strength of fusion-bonded area 1A1, i.e., without degrading the sealing reliability.

Additionally, fusion-bonded area 1A1 may be provided with an inlet-shaped fusion-bonding free area, or provided with a stress concentrating part, or provided with a pressure releasing feature such as a hole.

While the present invention has been described by giving several representative examples, it should be apparent that the present invention is not limited to these examples, but can be modified as appropriate within the technical idea of the present invention.

For example, in the film-covered battery shown in FIG. 2, the sealed space is formed by sandwiching battery element 2 between two exterior films 5, and by thermally fusion-bonding opposing four sides of exterior films 5 around battery element 2, but the sealed space may be formed by another method. For example, a single exterior film may be folded into two to sandwich battery element 2 in between, and three open sides may be thermally fusion-bonded to form a sealed space for sealing battery element 2 therein.

In regard to the structure of battery element 2, the foregoing example has shown a stack type which comprises a plurality of alternately stacked positive plates and negative plates. Alternatively, a battery element of a winding type may be used instead, where a positive plate, a negative plate, and a separator are formed in a strip shape, the positive plate and negative plate are laid one on the top of the other with the separator placed therebetween, they are wound, and thereafter they are compressed into a flat shape, thereby creating an alternate stack arrangement having a positive pole and a negative pole.

Also, battery element 2 is only required to include a positive pole, a negative pole, and electrolyte, so that an arbitrary battery element for use in ordinary batteries can be applied as battery element 2.

A battery element in a general lithium ion secondary battery is formed of a positive plate made of aluminum foil or the like which is coated on both sides with a positive pole active material such as lithium manganese composite oxide, lithium cobaltate or the like, and a negative plate made of copper foil or the like which is coated on both sides with a carbon material capable of being doped and undoped with lithium. The positive plate and negative plate are arranged to be opposite to each other through a separator, and are impregnated with an electrolytic solution including lithium salt to complete the battery.

Otherwise, battery elements for other types of chemical batteries may be used as battery element 2, such as nickel hydrogen battery, nickel cadmium battery, lithium-metal primary battery or secondary battery, lithium polymer battery, and the like.

Further, while FIG. 2 has shown an example in which positive electrode lead 3 and negative electrode lead 4 are extended from opposite sides of film-covered battery 1, they may be extended from the same side.

Additionally, a film-covered battery may serve as a holding member.

According to a first packaged battery, a pocket provided with a safety valve protrudes to the outside of a holding member through an opening. Thus, the pocket is not restricted from expanding by the holding member, but large expansion of the size of the pocket can occur due to a gas generated within a sealed space. When the pocket expands to a certain volume, the safety valve is opened by the action of the large tension generated in the pocket to discharge the gas within the sealed space from the safety valve. In this way, large tension can be transmitted to the safety valve with a lower inner pressure than when the pocket is included in a space restricted by the holding member.

Accordingly, for example, even without reducing the strength of the opening of the safety valve, i.e., even without degrading the sealing reliability, it is possible to prevent a dangerous state, as before, in which the expandable size of a fusion-bonding free area for transmitting tension to a fusion-bonding free area as the safety valve is restricted by a holding member to prevent the fusion-bonding free area from expanding to a sufficient size, thus failing to open the safety valve, with the result that the film-covered battery is filled with a high-pressure gas. This results in a reduction in the risk of fracture in the sealing at a site in the fusion-bonding free area except in the area of the safety valve.

Notably, an appropriately large amount of gas is required for the pocket to expand largely, but what is important here is that when a gas is generated which increases the inner pressure, a difference grows between the tension of the pocket which is transmitted to the safety valve and the tension of the exterior films applied to a site in the fusion-bonding free area except in the area of the safety valve, thereby reducing the risk of an unintended fracture in sealing at a site except in the area of the safety valve.

The advantages described above are also applied to a second and a third packaged battery, a first and a second stacked battery assembly, and a film-covered battery of the present invention, described below.

According to a second packaged battery, a pocket can be kept in a smaller size except for an abnormal event (when a gas is generated), in addition to similar advantages to those of the first packaged battery of the present invention.

If the pocket was made larger, the protruding portion of the pocket will wastefully occupy the space, ie no benefit. Thus, when the size of the pocket is kept in a smaller, except for the case in which an abnormal event may occur (when gas is generated), no space will be wastefully used, even if a large pocket is provided.

According to a third packaged battery, a pocket is not restricted from expanding by a holding member, but large expansion of the size of the pocket can occur by gas generated within a sealed space. As the pocket expands to a certain volume, the large tension generated in the pocket causes a safety valve to open, thus discharging the gas within the sealed space from the safety valve. In this way, large tension can be transmitted to the safety valve with a lower inner pressure than when the pocket is restricted from expanding both on the top and on the bottom because of the existence of holding members.

According to a first stacked battery assembly, a pocket does not mutually interfere with pockets of adjacent film-covered batteries. Thus, the pocket of each battery is prevented from obstructing the expansion of pockets of other batteries. Accordingly, even if a plurality of film-covered batteries are stacked in their thickness direction, it is possible to prevent a dangerous state in which the film-covered batteries are filled with a high-pressure gas.

According to a second stacked battery assembly, a plurality of film-covered batteries are stacked, pockets can be laid one on another, but when the pockets are folded or bent in a normal state (when no gas is generated), a pocket is released, by the action of an increase in the inner pressure only in a film-covered battery which fails and which suffers the increase in the inner pressure, to protrude to the outside of the contour of adjacent batteries, and is therefore less hindered by adjacent batteries from expanding and large expansion of the size of the pocket can occur. In this way, even if a pocket is arranged to be laid above and below pockets of adjacent batteries, large expansion of the size of the pocket can occur and the pocket can transmit a large tension to a safety valve with a small inner pressure.

In this regard, in the present invention and exemplary embodiments, a stacked battery assembly refers to film-covered batteries stacked directly or housed in holding members and stacked one above another, and connected in series or in parallel. When directly stacked, a double-sided tape, a bonding agent, a buffering material, a spacer or the like may intervene between adjacent film-covered batteries.

According to a film-covered battery, an exterior film includes an opening which is fusion-bonded to define a fusion-bonding free area for the exterior film which is opposite a main surface of a positive plate or a negative plate. Accordingly, as the sealed space expands due to generated gas, the fusion-bonding free area is applied with stress which acts to tear off the fusion-bonding free area so that the fusion-bonding free area is torn off, and the gas is discharged from a site at which the fusion-bonding free area is torn off. The stress which tears off the fusion-bonding free area is large because it conforms to the size of the main surface of the positive plate or negative plate. Consequently, it is possible to prevent a dangerous state in which the film-covered battery is filled with a high-pressure gas.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2007-40976, filed on Feb. 21, 2007, the disclosure of which is incorporated herein in its entirety by reference.

The invention claimed is:

1. A stacked battery assembly comprised of a plurality of stacked film-covered batteries, wherein:
said film-covered battery comprises:
a battery element; and
exterior films which form a sealed space which fits said battery element therein,
said sealed space includes a housing section which houses said battery element therein, and a pocket communicating with said housing section to expand due to an increase in the inner pressure of said sealed space,
said pocket includes a safety valve configured to operate due to expansion of said pocket,
said pocket is positioned on a side orthogonal to the stacking direction in said film-covered battery, and
said pocket is disposed at a position that is, in planar view, different from other pockets in adjacent ones of said film-covered batteries.

2. A film-covered battery comprising:
a battery element, and
exterior films which form a sealed space into which said battery element fits, wherein:
said sealed space includes:
a housing section which houses said battery element therein, and
a pocket communicating with said housing section to expand due to an increase in the inner pressure of said sealed space,
said pocket includes a safety valve configured to operate due to expansion of said pocket,
said pocket is folded or wound, and is unfolded or unwound due to an increase in the inner pressure,
said pocket is disposed at a position that is, in planar view, different from other pockets in adjacent ones of said battery element.

3. The film-covered battery according to claim 2, wherein, in a situation in which said film-covered battery is held in a holding member that includes an opening or a notch, said pocket is unfolded or unwound due to an increase in the inner pressure such that at least part of said pocket and said safety valve protrude to the outside of said holding member from said opening or said notch.

4. The film-covered battery according to claim 2, wherein said film-covered battery is stacked on another film-covered battery that has a structure that is identical with a structure of said film covered battery, and said pocket is unfolded or unwound due to an increase in the inner pressure such that at least part of said pocket and said safety valve protrude to the outside of the contour of said another film-covered battery.

5. The stacked battery assembly according to claim 1, wherein said pocket is disposed at a position that does not overlap with other pockets in adjacent ones of the film-covered batteries.

6. The stacked battery assembly according to claim 1, wherein said pocket is disposed at a position at which, when the pocket expands, the pocket does not come into contact with other pockets in adjacent ones of the film-covered batteries.

7. The stacked battery assembly according to claim 1, wherein each pocket of the adjacent ones of said film-covered batteries is disposed at a position that is opposite to the pocket of another pocket of the adjacent ones of said film-covered battery.

8. The stacked battery assembly according to claim 1, wherein the film-covered batteries are alternatively stacked right side up and upside down.

9. The stacked battery assembly according to claim 1, wherein said pocket is folded or wound, and is unfolded or unwound due to an increase in the inner pressure.

* * * * *